(12) United States Patent
Ye et al.

(10) Patent No.: US 11,953,777 B2
(45) Date of Patent: Apr. 9, 2024

(54) DISPLAY MODULE AND DISPLAY DEVICE

(71) Applicant: WUHAN CHINA STAR OPTOELECTRONICS TECHNOLOGY CO., LTD., Hubei (CN)

(72) Inventors: Wenlong Ye, Hubei (CN); Rui He, Hubei (CN); Wei Cheng, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 17/622,790

(22) PCT Filed: Dec. 15, 2021

(86) PCT No.: PCT/CN2021/138493
§ 371 (c)(1),
(2) Date: Dec. 24, 2021

(87) PCT Pub. No.: WO2023/102985
PCT Pub. Date: Jun. 15, 2023

(65) Prior Publication Data
US 2024/0036387 A1    Feb. 1, 2024

(30) Foreign Application Priority Data
Dec. 10, 2021    (CN) .......................... 202111506223.1

(51) Int. Cl.
G02F 1/1333    (2006.01)
G02F 1/1334    (2006.01)
(Continued)

(52) U.S. Cl.
CPC .... G02F 1/133528 (2013.01); G02F 1/13345 (2021.01); G02F 1/1337 (2013.01); G02F 1/134309 (2013.01)

(58) Field of Classification Search
CPC ......... G02F 1/133528; G02F 1/133531; G02F 1/13345; G02F 1/1334; G02F 1/13347;
(Continued)

(56) References Cited

U.S. PATENT DOCUMENTS 4,772,943 A    9/1988  Nakagawa et al.
5,969,850 A    10/1999  Harrold et al.
(Continued)

FOREIGN PATENT DOCUMENTS

CN    1804681 A    7/2006
CN    201097041 Y    8/2008
(Continued)

OTHER PUBLICATIONS

International Search Report in International application No. PCT/CN2021/138493, dated Jul. 27, 2022.
(Continued)

*Primary Examiner* — Hoan C Nguyen
(74) *Attorney, Agent, or Firm* — PV IP PC; Wei Te Chung; Zhigang Ma

(57) ABSTRACT

The present application discloses a display module and a display device. The display module includes a light grating assembly. The light grating assembly includes alternately arranged first regions and second regions, and liquid crystal molecules and dye molecules distributed in the first regions and the second regions. Arrangement of the liquid crystal molecules and the dye molecules are controlled to make the first regions light-transmissive and the second regions light-transmissive under a first mode and not light-transmissive
(Continued)

under a second mode to form alternately light and dark stripes under the second mode.

20 Claims, 9 Drawing Sheets

(51) Int. Cl.
*G02F 1/1335* (2006.01)
*G02F 1/1337* (2006.01)
*G02F 1/1343* (2006.01)

(58) Field of Classification Search
CPC ............. G02F 1/1337; G02F 1/133703; G02F 1/133711; G02F 1/134309; G02F 1/13475; G02F 1/13731; G02F 1/13737; G02F 1/13743; G02F 1/1375; G02F 1/13756; G02F 1/133365; G02F 1/13342; G02F 1/133715; G02F 1/13775; G02F 1/13781; G02F 1/15165
See application file for complete search history.

(56) References Cited

U.S. PATENT DOCUMENTS

| | | | |
|---|---|---|---|
| 6,084,647 | A | 7/2000 | Hatano et al. |
| 2002/0047837 | A1 | 4/2002 | Suyama et al. |
| 2015/0219907 | A1* | 8/2015 | Li ................. G02B 30/30 445/24 |
| 2019/0098289 | A1 | 3/2019 | Palmer |

FOREIGN PATENT DOCUMENTS

| | | | | | |
|---|---|---|---|---|---|
| CN | 105301850 | A | | 2/2016 | |
| CN | 106764933 | A | * | 5/2017 | |
| CN | 106773233 | A | | 5/2017 | |
| CN | 108227228 | A | | 6/2018 | |
| CN | 110456538 | A | | 11/2019 | |
| CN | 110673416 | A | | 1/2020 | |
| CN | 111142300 | A | | 5/2020 | |
| CN | 111965863 | A | | 11/2020 | |
| CN | 112987398 | A | | 6/2021 | |
| CN | 113031348 | A | | 6/2021 | |
| JP | H11122639 | A | | 4/1999 | |
| JP | 2011069921 | A | | 4/2011 | |
| WO | WO-2012032745 | A1 | * | 3/2012 | ......... G02F 1/13476 |
| WO | 2015133862 | A1 | | 9/2015 | |
| WO | WO-2022205512 | A1 | * | 10/2022 | ........... G02F 1/1336 |

OTHER PUBLICATIONS

Written Opinion of the International Search Authority in International application No. PCT/CN2021/138493, dated Jul. 27, 2022.
Chinese Office Action issued in corresponding Chinese Patent Application No. 202111506223.1 dated Aug. 2, 2022, pp. 1-8.

* cited by examiner

DISPLAY MODULE AND DISPLAY DEVICE

FIELD OF INVENTION

The present application relates to a field of display technologies, especially to a display module and a display device comprising the display module.

BACKGROUND OF INVENTION

A human perceives a depth of an object through minor difference between the object viewed by left and right eyes respectively for. A brain, by motion and adjustment of eyeballs, integrates information of such two images to recognize three-dimensional images to generate a three-dimensional sense. A 3D naked eye technology refers to allowing left and right eyes to see two images of parallax difference from a display screen without any tools and generating a three-dimensional sense by integration of a brain to information of such two images.

With the rapid development of display technology, 3D display with more realistic visual effects is more and more popular with consumers. For a conventional 3D naked eye display technology, a switchable liquid crystal light grating is generally used to achieve switch of 3D and 2D modes. A switchable liquid crystal light grating needs to be used by the liquid crystal box with the upper and lower layer polarizers, which increases the thickness of the display and disadvantages the demand for thinner and lighter displays.

SUMMARY OF INVENTION

Technical Issue

An embodiment of the present application provides a display module and a display device, the display module without an additional polarizer can achieve liquid crystal light grating function and achieve switch of 3D and 2D modes.

Technical Solution

An embodiment of the present application provides a display module, comprising a display panel, a light grating assembly disposed on a side of the display panel, and a first polarizer disposed between the display panel and the light grating assembly;
  wherein the light grating assembly comprises a plurality of first regions and a plurality of second regions alternately disposed, one of the second regions is disposed between adjacent two of the first regions;
  wherein the light grating assembly further comprises:
    a first substrate;
    a second substrate disposed opposite to the first substrate; and
    a liquid crystal layer disposed between the first substrate and the second substrate, and comprising first liquid crystal molecules and first dye molecules distributed in the first regions and second liquid crystal molecules and second dye molecules distributed in the second regions;
  wherein the display module switches between a first mode and a second mode, under the first mode, a light transmission axis direction of the first dye molecules, a light transmission axis direction of the second dye molecules are parallel to a light transmission axis direction of the first polarizer to make light pass through the first regions and the second regions; under the second mode, a light transmission axis direction of the first dye molecules is parallel to the light transmission axis direction of the first polarizer, a light absorbing axis direction of the second dye molecules is parallel to the light transmission axis direction of the first polarizer to make an amount of light passing through the first regions greater than an amount of light passing through the second regions.

In an embodiment of the present application, under the first mode, long axes of the first liquid crystal molecules, long axes of the first dye molecules, long axes of the second liquid crystal molecules, and long axes of the second dye molecules are arranged along a first direction, under the second mode, the long axes of the first liquid crystal molecules and the long axes of the first dye molecules are arranged along the first direction, and the long axes of the second liquid crystal molecules and the long axes of the second dye molecules are arranged along a second direction, and the first direction is perpendicular to the second direction;
  wherein a light absorbing axis direction of the first dye molecules is parallel to a long axis direction of the first dye molecules, the light absorbing axis direction of the second dye molecules is parallel to a long axis direction of the second dye molecules, the light transmission axis direction of the first polarizer is parallel to the second direction.

In an embodiment of the present application, the light grating assembly further comprises a first electrode layer disposed on a side of the first substrate near the second substrate and a second electrode layer disposed on a side of the second substrate near the first substrate, the first electrode layer and the second electrode layer are configured to apply a voltage and at least adjust an arrangement direction of the long axes of the second liquid crystal molecules arrangement direction to control the display module to switch between the first mode and the second mode.

In an embodiment of the present application, the first liquid crystal molecules and the second liquid crystal molecules are negative liquid crystals, and the first electrode layer comprises first sub-electrodes disposed in the second regions.

In an embodiment of the present application, the light grating assembly further comprises a first alignment layer disposed on a side of the first electrode layer away from the first substrate and a second alignment layer disposed on a side of the second electrode layer away from the second substrate such that an the initial alignment direction of the first liquid crystal molecules and an the initial alignment direction of the second liquid crystal molecules are parallel to the first direction.

In an embodiment of the present application, the first liquid crystal molecules and the second liquid crystal molecules are positive liquid crystals, the first electrode layer comprises second sub-electrodes disposed in the first regions and third sub-electrodes disposed in the second regions, the light grating assembly further comprises first wirings connected to the second sub-electrodes and second wirings connected to the third sub-electrodes to apply voltages to the second sub-electrodes and the third sub-electrodes respectively.

In an embodiment of the present application, the light grating assembly further comprises a third alignment layer disposed on a side of the first electrode layer away from the first substrate and a fourth alignment layer disposed on a side of the second electrode layer away from the second substrate such that an the initial alignment direction of the first liquid crystal molecules and an the initial alignment direction of the second liquid crystal molecules are perpendicular to the first direction.

In an embodiment of the present application, the first direction is perpendicular to the first substrate and the second substrate.

The present application, according to the above objective, provides a display module, comprising a display panel and a light grating assembly disposed on a side of the display panel;
  wherein the light grating assembly comprises a plurality of first regions and a plurality of second regions alternately disposed, one of the second regions is disposed between adjacent two of the first regions;
  wherein the light grating assembly further comprises:
  a first substrate;
  a second substrate disposed opposite to the first substrate; and
  a liquid crystal layer disposed between the first substrate and the second substrate and comprising first polymer liquid crystals and first dye molecules distributed in the first regions and second polymer liquid crystals and second dye molecules distributed in the second regions, and the first polymer liquid crystals comprises first liquid crystal molecules and first polymer structures, the second polymer liquid crystals comprises second liquid crystal molecules and second polymer structures;
  wherein the display module switches between a first mode and a second mode, under the first mode, light entering the liquid crystal layer along a third direction has a refractive index through the first liquid crystal molecules the same as a refractive index through the first polymer structures, long axes of the second liquid crystal molecules and long axes of the second dye molecules are arranged along the third direction, and the third direction is perpendicular to the first substrate and the second substrate such that the light passes through the first regions and the second regions, under the second mode, light entering the liquid crystal layer along the third direction has the refractive index through the first liquid crystal molecules the same as the refractive index through the first polymer structures, and has a refractive index through at least some of the second liquid crystal molecules different from a refractive index through the second polymer structures such that an amount of the light passing through the first regions is greater than an amount of the light passing through the second regions.

In an embodiment of the present application, the first liquid crystal molecules and the second liquid crystal molecules are positive liquid crystals, the first polymer liquid crystals and the second polymer liquid crystals are polymer dispersed liquid crystals, under the first mode, long axes of the first liquid crystal molecules and long axes of the first dye molecules are arranged along the third direction such that the light entering the liquid crystal layer along the third direction has the refractive index through the first liquid crystal molecules the same as the refractive index through the first polymer structures.

In an embodiment of the present application, under the second mode, long axes of at least some of the second liquid crystal molecules are arranged along a direction other than the third direction such that the light entering the liquid crystal layer along the third direction has the refractive index through at least some of the second liquid crystal molecules different from the refractive index through the second polymer structures.

In an embodiment of the present application, the first liquid crystal molecules and the second liquid crystal molecules are negative liquid crystals, and the first polymer liquid crystals and the second polymer liquid crystals are polymer network liquid crystals, under the first mode, long axes of the first liquid crystal molecules, long axes of the first dye molecules, and the first polymer structures are arranged along a fourth direction, the long axes of the second liquid crystal molecules, the long axes of the second dye molecules, and the second polymer structures are arranged along the third direction, and the fourth direction is perpendicular to the third direction.

In an embodiment of the present application, under the second mode, long axes of the first liquid crystal molecules, long axes of the first dye molecules, long axes of the second liquid crystal molecules, long axes of the second dye molecules, and the first polymer structures are arranged along the fourth direction and the second polymer structures is arranged along the third direction.

In an embodiment of the present application, the light grating assembly further comprises a first electrode layer disposed on a side of the first substrate near the second substrate and a second electrode layer disposed on a side of the second substrate near the first substrate, the first electrode layer and the second electrode layer are configured to apply a voltage and at least adjust an arrangement direction of the long axes of the second liquid crystal molecules arrangement direction to control the display module to switch between the first mode and the second mode.

The present application, according to the above objective, comprising a display module, the display module comprising a display panel and a light grating assembly disposed on a side of the display panel;
  wherein the light grating assembly comprises a plurality of first regions and a plurality of second regions alternately disposed, one of the second regions is disposed between adjacent two of the first regions;
  wherein the light grating assembly further comprises:
  a first substrate;
  a second substrate disposed opposite to the first substrate; and
  a liquid crystal layer disposed between the first substrate and the second substrate and comprising first polymer liquid crystals and first dye molecules distributed in the first regions and second polymer liquid crystals and second dye molecules distributed in the second regions, and the first polymer liquid crystals comprises first liquid crystal molecules and first polymer structures, the second polymer liquid crystals comprises second liquid crystal molecules and second polymer structures;
  wherein the display module switches between a first mode and a second mode, under the first mode, light entering the liquid crystal layer along a third direction has a refractive index through the first liquid crystal molecules the same as a refractive index through the first polymer structures, long axes of the second liquid crystal molecules and long axes of the second dye molecules are arranged along the third direction, and the third direction is perpendicular to the first substrate and the second substrate such that the light passes through the first regions and the second regions, under the second mode, light entering the liquid crystal layer along the third direction has the refractive index through the first liquid crystal molecules the same as the refractive index through the first polymer structures, and has a refractive index through at least some of the second liquid crystal molecules different from a refractive index through the second polymer structures such that an amount of the light passing through the first regions is greater than an amount of the light passing through the second regions.

In an embodiment of the present application, the first liquid crystal molecules and the second liquid crystal molecules are positive liquid crystals, the first polymer liquid crystals and the second polymer liquid crystals are polymer dispersed liquid crystals, under the first mode, long axes of the first liquid crystal molecules and long axes of the first dye molecules are arranged along the third direction such that the light entering the liquid crystal layer along the third direction has the refractive index through the first liquid crystal molecules the same as the refractive index through the first polymer structures.

In an embodiment of the present application, under the second mode, long axes of at least some of the second liquid crystal molecules are arranged along a direction other than the third direction such that the light entering the liquid crystal layer along the third direction has the refractive index through at least some of the second liquid crystal molecules different from the refractive index through the second polymer structures.

In an embodiment of the present application, the first liquid crystal molecules and the second liquid crystal molecules are negative liquid crystals, and the first polymer liquid crystals and the second polymer liquid crystals are polymer network liquid crystals, under the first mode, long axes of the first liquid crystal molecules, long axes of the first dye molecules, and the first polymer structures are arranged along a fourth direction, the long axes of the second liquid crystal molecules, the long axes of the second dye molecules, and the second polymer structures are arranged along the third direction, and the fourth direction is perpendicular to the third direction.

In an embodiment of the present application, under the second mode, long axes of the first liquid crystal molecules, long axes of the first dye molecules, long axes of the second liquid crystal molecules, long axes of the second dye molecules, and the first polymer structures are arranged along the fourth direction and the second polymer structures is arranged along the third direction.

In an embodiment of the present application, the light grating assembly further comprises a first electrode layer disposed on a side of the first substrate near the second substrate and a second electrode layer disposed on a side of the second substrate near the first substrate, the first electrode layer and the second electrode layer are configured to apply a voltage and at least adjust an arrangement direction of the long axes of the second liquid crystal molecules arrangement direction to control the display module to switch between the first mode and the second mode.

Advantages

Compared to the conventional technology, the present application increases dye molecules in the liquid crystal layer of the light grating assembly and according to guest-host effect of the liquid crystal molecules and the dye molecules, and controls rotation of the liquid crystal molecules of alternate first regions and second regions to control rotation of the dye molecules of the first regions of the second regions to achieve difference between a light flux in the first regions and a light flux in the second regions of the light grating assembly to further achieve alternate light and dark stripes to further achieve a liquid crystal light grating function such that the display module can switch between 3D and 2D modes. Moreover, the present application only needs the light grating assembly with a first polarizer on the display panel to achieve the function of switching between the 3D and 2D modes without an additional polarizer, which advantages thinness and compactness of the display module.

DESCRIPTION OF DRAWINGS

Specific embodiments of the present invention are described in details with accompanying drawings as follows to make technical solutions and advantages of the present invention clear.

DETAILED DESCRIPTION OF PREFERRED EMBODIMENTS

Figure 1:
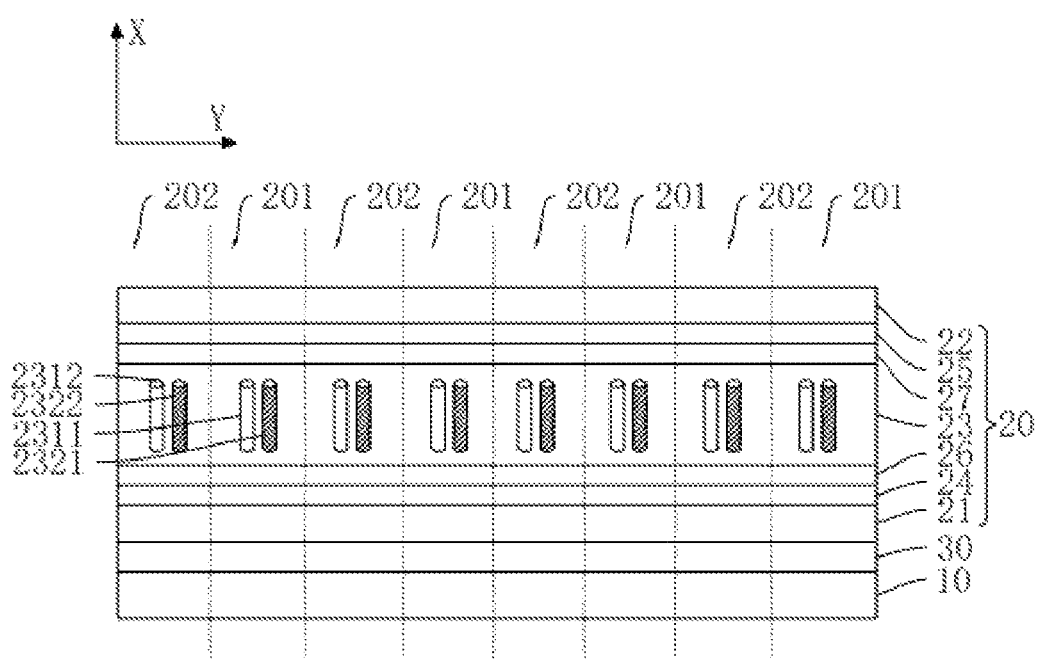
FIG. 1 is a schematic structural view of a display module provided by an embodiment of the present application.

The technical solution in the embodiment of the present application will be clearly and completely described below with reference to the accompanying drawings in the embodiments of the present application. Apparently, the described embodiments are merely some embodiments of the present application instead of all embodiments. According to the embodiments in the present application, all other embodiments obtained by those skilled in the art without making any creative effort shall fall within the protection scope of the present application.

The following disclosure provides many different embodiments or examples to achieve different structures of the present application. To simplify the disclosure of the present application, the components and arrangements of the specific examples are described below. Of course, they are merely examples, and the purpose is not to limit the present application. Furthermore, the present application may repeat reference numerals and/or reference letters in different examples. The repetition is for the purpose of simplification and clarity, and does not by itself indicate the relationship between the various embodiments and/or settings discussed. In addition, the present application provides examples of various specific processes and materials, but a person of ordinary skill in the art can be aware of the application of other processes and/or the use of other materials.

With reference to FIG. 1, the embodiment of the present application provides a display module, the display module comprises a display panel 10, a light grating assembly 20 and a first polarizer 30. The light grating assembly 20 is disposed on a side of the display panel 10, and the first polarizer 30 is disposed between the display panel 10 and the light grating assembly 20.

The light grating assembly 20 comprises a plurality of the first regions 201 and a plurality of the second regions 202 disposed alternately, and one of the second regions 202 is disposed between adjacent two of the first regions 201.

The light grating assembly 20 further comprises a first substrate 21 and a second substrate 22 disposed oppositely and a liquid crystal layer 23 disposed between the first substrate 21 and the second substrate 22. The liquid crystal layer 23 comprises first liquid crystal molecules 2311 and first dye molecules 2321 distributed in the first regions 201, and second liquid crystal molecules 2312 and second dye molecules 2322 distributed in the second regions 202.

Furthermore, the display module provided by the embodiment of the present application switches between a first mode and a second mode. Under the first mode, a light transmission axis direction of the first dye molecules 2321 and a light transmission axis direction of the second dye molecules 2322 are parallel to a light transmission axis direction of the first polarizer 30 such that light passes through the first regions 201 and the second regions 202. Under the second mode, the light transmission axis direction of the first dye molecules 2321 is parallel to the light transmission axis direction of the first polarizer 30, a light absorbing axis direction of the second dye molecules 2322 is parallel to the light transmission axis direction of the first polarizer 30 such that an amount of light passing through the first regions 201 is greater than an amount of light passing through the second regions 202.

During application of the embodiment, the embodiment of the present application adds dye molecules into the liquid crystal layer 23. According to a guest-host effect of the liquid crystal molecules and dye molecules, an arrangement direction of the first dye molecules 2321 in the first regions 201 is determined according to an arrangement direction of the first liquid crystal molecules 2311, an arrangement direction of the second dye molecules 2322 in the second regions 202 is determined according to an arrangement direction the second liquid crystal molecules 2312 such that under the first mode, the light transmission axis direction of the first dye molecules 2321 and the light transmission axis direction of the second dye molecules 2322 are controlled to be parallel to the light transmission axis direction of the first polarizer 30 to make light simultaneously the first regions 201 and the second regions 202 to achieve 2D display of the display module. Under the second mode, the light transmission axis direction of the first dye molecules 2321 is controlled to be parallel to the light transmission axis direction of the first polarizer 30, the light absorbing axis direction of the second dye molecules 2322 is parallel to the light transmission axis direction of the first polarizer 30 to make light pass through the first regions 201, not pass through the second regions 202 or partially pass through the second regions 202, to form an alternately light and dark stripe structure in the light grating assembly 20 to achieve 3D display of the display module.

Figure 2:
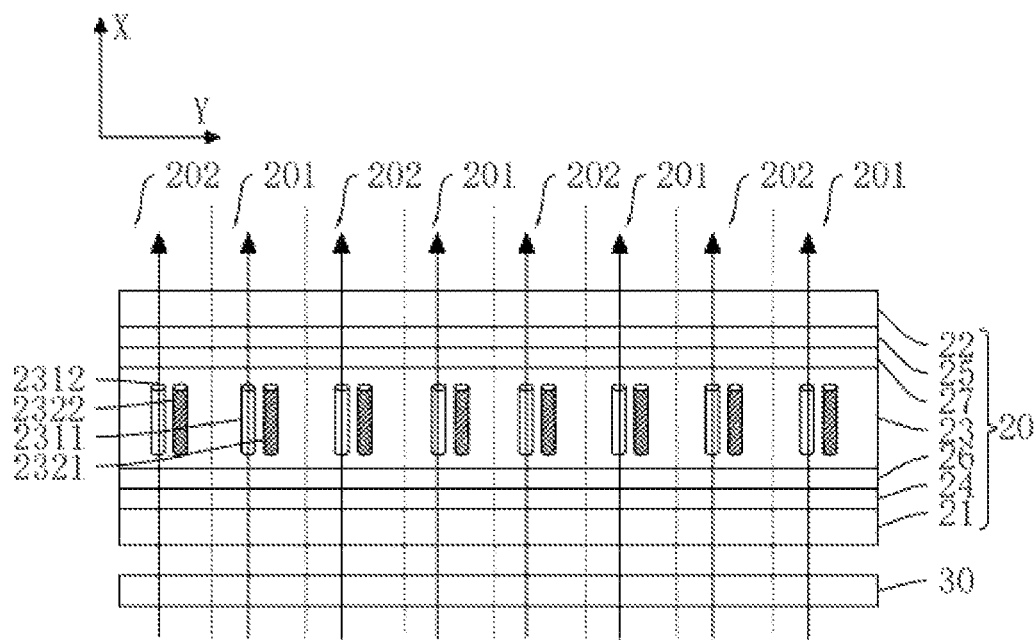
FIG. 2 is a schematic view of a light path of the display module provided by the embodiment of the present application under a first mode.
Figure 3:
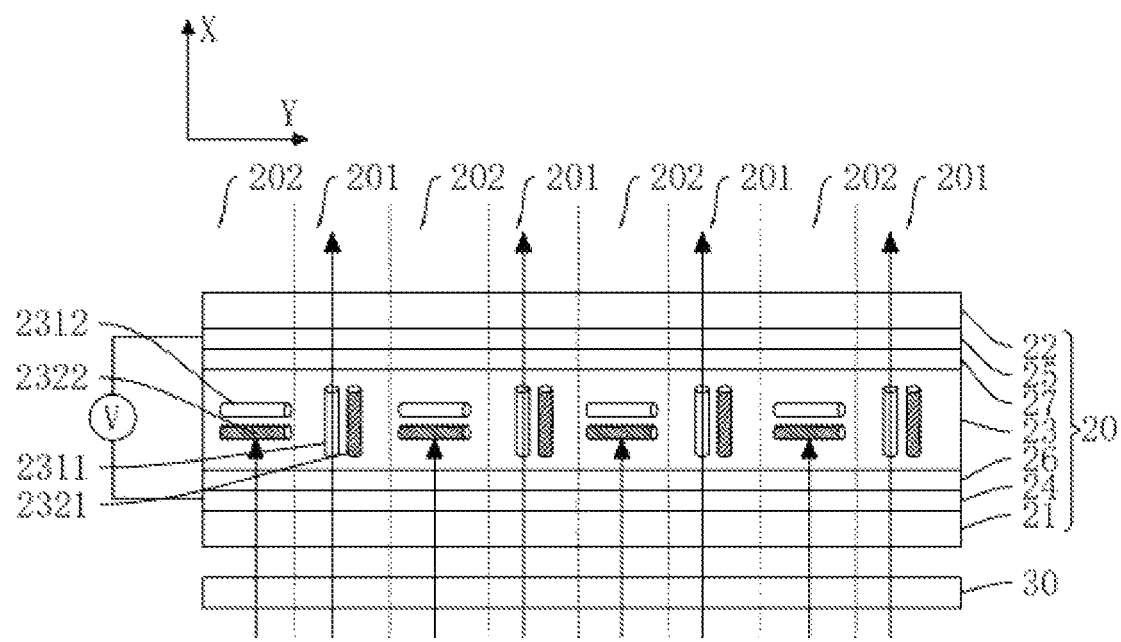
FIG. 3 is a schematic view of a light path of the display module provided by the embodiment of the present application under the second mode.

In particular, In an embodiment of the present application, with reference to FIG. 1, FIG. 2, and FIG. 3, the display module comprises a display panel 10 and a light grating assembly 20 disposed oppositely, and a first polarizer 30 disposed between the display panel 10 and the light grating assembly 20. The light transmission axis direction of the first polarizer 30 is parallel to a first substrate 21 and a second substrate 22.

The display panel 10 can be a liquid crystal display (LCD) panel or an organic light emitting diode (OLED) display panel, and the first polarizer 30 can be a polarizer on the liquid crystal display panel or the organic light emitting diode display panel.

It should be explained that the light grating assembly 20 is disposed on a light exiting side of the display panel 10, and the light grating assembly 20 can control forming an alternately light and dark light grating pattern to control a light exiting path of the display panel 10 such that a 3D display effect can be presented when a user watches the display module. Simultaneously, the light grating assembly 20 can be controlled to be a light transmission state without changing the light exiting path of the display panel 10 such that the 2D display effect can be presented when the user watches the display module so the display module provided by the embodiment of the present application can switch between the 2D display and the 3D display.

In the embodiment of the present application, the light grating assembly 20 comprises a first substrate 21 and a second substrate 22 disposed oppositely, a first electrode layer 24 disposed on a side of the first substrate 21 near the second substrate 22, a second electrode layer 25 disposed on a side of the second substrate 22 near the first substrate 21, a first alignment layer 26 disposed on a side of the first electrode layer 24 near the second substrate 22, a second alignment layer 27 disposed on a side of the second electrode layer 25 near the first substrate 21, and a liquid crystal layer 23 disposed between the first alignment layer 26 and the second alignment layer 27.

The light grating assembly 20 comprises a plurality of the first regions 201 and a plurality of the second regions 202 spaced from one another, and one of the second regions 202 is disposed between adjacent two of the first regions 201. Namely, the first regions 201 and the second regions 202 are arranged alternately. The liquid crystal layer 23 comprises first liquid crystal molecules 2311 and first dye molecules 2321 distributed in the first regions 201 and the second liquid crystal molecules 2312 and the second dye molecules 2322 distributed in the second regions 202.

The first liquid crystal molecules 2311 and the second liquid crystal molecules 2312 are negative liquid crystals.

Optionally, the first dye molecules 2321 and the light transmission axis direction of the second dye molecules 2322 are perpendicular to the long axis direction thereof, and the first dye molecules 2321 and the light absorbing axis direction of the second dye molecules 2322 are parallel to the long axis direction thereof.

Furthermore, a first direction X and a second direction Y perpendicular to each other are set, and the first direction X is perpendicular to the first substrate 21 and the second substrate 22, then the second direction Y is parallel to the first substrate 21 and the second substrate 22. The first alignment layer 26 and the second alignment layer 27 can supply the first liquid crystal molecules 2311 and the second liquid crystal molecules 2312 in the liquid crystal layer 23 with an orientation function such that the first liquid crystal molecules 2311 and the second liquid crystal molecules 2312 have an initial alignment direction. Furthermore, in the present embodiment, the initial alignment direction of the first liquid crystal molecules 2311 and the second liquid crystal molecules 2312 are parallel to the first direction X. Namely, a direction of long axes of the first liquid crystal molecules 2311 and a direction of long axes of the second liquid crystal molecules 2312 are arranged along the first direction X.

As such, under the first mode, the first electrode layer 24 and the second electrode layer 25 needs no an applied voltage such that the first liquid crystal molecules 2311 and the second liquid crystal molecules 2312 keep initial alignment. Namely, the long axes of the first liquid crystal molecules 2311 and the long axes of the second liquid crystal molecules 2312 are arranged along the first direction X, and both the first dye molecules 2321 and the second dye molecules 2322 keep the initial alignment due to a guest-host effect, namely, long axes of the first dye molecules 2321 and long axes of the second dye molecules 2322 are arranged along the first direction X. In the meantime, the first dye molecules 2321 and the light transmission axis direction of the second dye molecules 2322 are parallel to the second direction Y, and the light transmission axis direction of the first polarizer 30 is also parallel to the second direction Y. Therefore, light emitted out through the display panel 10 can pass through the first regions 201 and the second regions 202 of the light grating assembly 20. Therefore, when the display module is under the first mode, the light grating assembly 20 does not affect a light exiting path of the display panel 10 的 such that the display module is in the 2D display state.

Under the second mode, by controlling a voltage of the first electrode layer 24 and the second electrode layer 25, the second liquid crystal molecules 2312 in the second regions 202 rotate while the first liquid crystal molecules 2311 in the first regions 201 still keep the initial alignment. In the meantime, both the long axes of the first liquid crystal molecules 2311 and the long axes of the first dye molecules 2321 keep arranged along the first direction X, and both the long axes of the second liquid crystal molecules 2312 and the long axes of the second dye molecules 2322 are arranged along the second direction Y. Because at this time the light absorbing axis direction of the second dye molecules 2322 is parallel to the second direction Y, and the light transmission axis direction of the first polarizer 30 is parallel to the second direction Y, the second dye molecules 2322 would absorb light passing through the first polarizer 30. Further, both the long axes of the first liquid crystal molecules 2311 and the long axes of the first dye molecules 2321 in the first regions 201 are arranged along the first direction X such that light passing through the first polarizer 30 can pass through the first regions 201, an amoung of light passing through the second regions 202 is less than an amoung of light passing through the first regions 201, the second regions 202 的 brightness is less than the first regions 201, to further form alternately light and dark stripes in the light grating assembly 20, which changes the light exiting path of the display panel 10 to make the display module in 3D display state.

Optionally, the first dye molecules 2321 and the second dye molecules 2322 are black dichroic dyes and can further absorb light to present black to improve light and dark difference between the first regions 201 and the second regions 202 for enhancement of the 3D display effect.

In the present embodiment, the first electrode layer 24 comprises first sub-electrodes disposed in the second regions 202, the first sub-electrodes can be strip electrodes, and the second electrode layer 25 can be an entire-surface covering electrode layer, and can be strip electrodes corresponding to the first sub-electrodes. Furthermore, in other embodiment of the present application, the second electrode layer 25 can comprise strip electrodes disposed in the second regions 202, and the first electrode layer 24 can be an entire-surface electrode. A voltage can be further applied to the first sub-electrodes and the second electrode layer 25 to make the second liquid crystal molecules 2312 in the second regions 202 rotate such that the long axes of the second liquid crystal molecules 2312 and long axes of the second dye molecules 2322 are arranged along the second direction Y to make the display module in the second mode. When the first sub-electrodes and the second electrode layer 25 are controlled to be not applied with a voltage, the long axes of the second liquid crystal molecules 2312 and the long axes of the second dye molecules 2322 keep arrangement along the first direction X such that the display module is in the first mode.

As described above, in the present embodiment, only controlling whether the electrode layer in the second regions 202 is applied with a voltage achieves rotation of the liquid crystal molecules and the dye molecules in the second regions 202 to make the second regions 202 in the light transmission state or the light absorption state such that the display module switching between the 2D display and 3D display is achieved. In the present embodiment only cooperation with an upper polarizer of the display panel 10 is required to achieve light and dark stripe arrangement of the light grating assembly 20. Compare to a conventional technology of polarizers required to be disposed on two sides of a liquid crystal cell respectively, the present application can save use of one polarizer, which enhance light weight and thinness of the display module. Furthermore, in the present embodiment, under the first mode applying a voltage to the first electrode layer 24 and the second electrode layer 25 is not needed, which can lower a power consumption of the display module.

Figure 4:
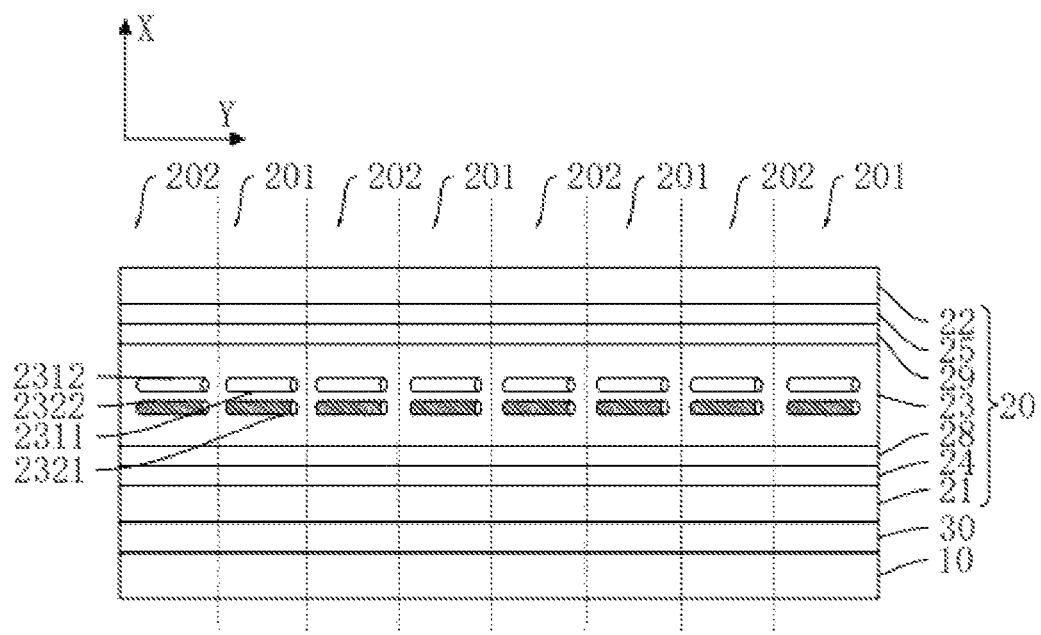
FIG. 4 is another schematic structural view of the display module provided by the embodiment of the present application.
Figure 5:
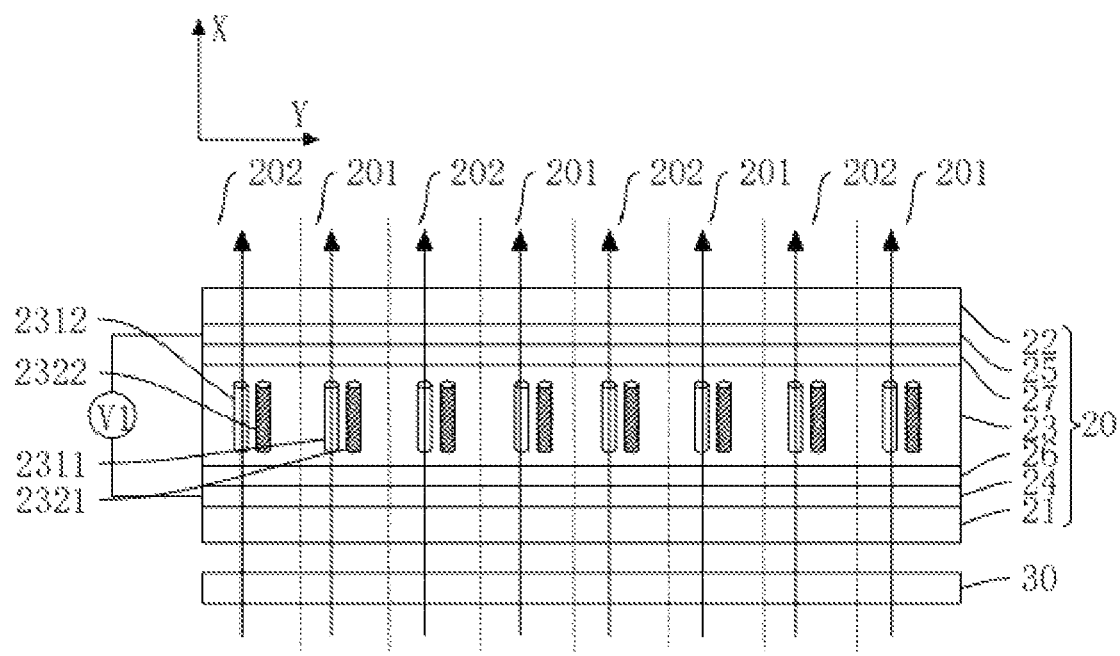
FIG. 5 is another schematic view of a light path of the display module provided by the embodiment of the present application under the first mode.
Figure 6:
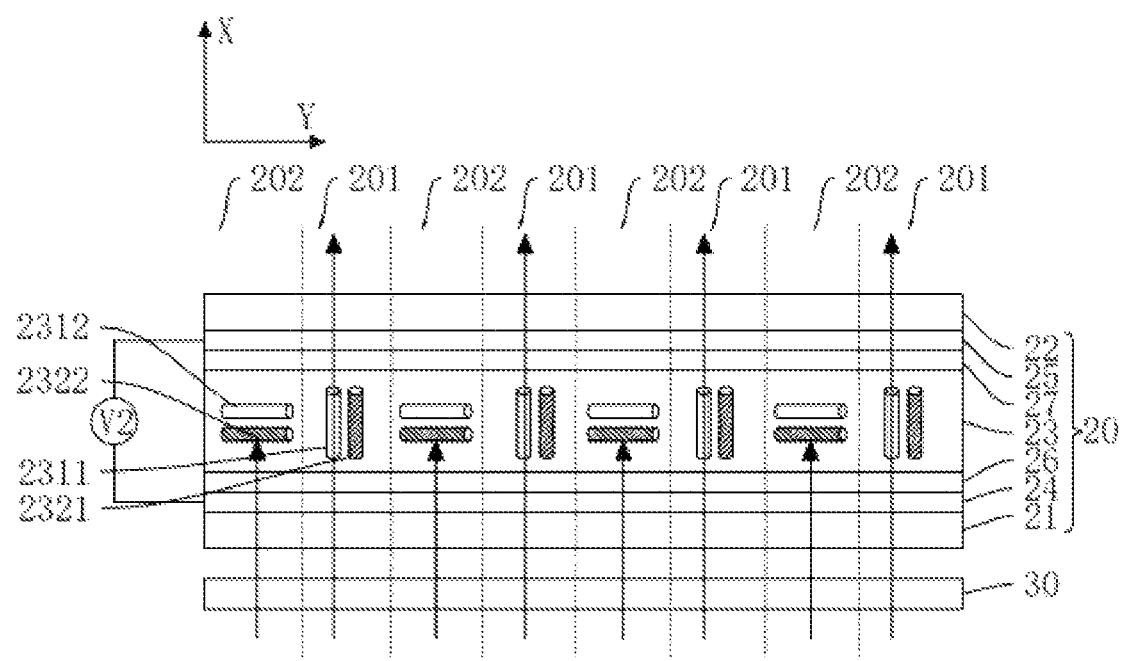
FIG. 6 is another schematic view of a light path of the display module provided by the embodiment of the present application under the second mode.

With reference to FIG. 4, FIG. 5, and FIG. 6, in another embodiment of the present application, and its difference from the former embodiment is that a third alignment layer 28 is disposed on the first electrode layer 24 near the second electrode layer 25 and a fourth alignment layer 29 is disposed on a side of the second electrode layer 25 near the first electrode layer 24 such that the initial alignment direction of the first liquid crystal molecules 2311 and the second liquid crystal molecules 2312 is perpendicular to the first direction X, namely, is parallel to the second direction Y.

The first liquid crystal molecules 2311 and the second liquid crystal molecules 2312 are positive liquid crystals. Therefore, applying a voltage to the first electrode layer 24 and the second electrode layer 25 makes the long axes of the first liquid crystal molecules 2311, the long axes of the first dye molecules 2321, the long axes of the second liquid crystal molecules 2312 and the long axes of the second dye molecules 2322 parallel to the first direction X. In the meantime, the first dye molecules 2321 and the light absorbing axis direction of the second dye molecules 2322 are parallel to the first direction X.

In the present embodiment, the first electrode layer 24 can comprise second sub-electrodes located in the first regions 201 and third sub-electrodes located in the second regions 202. Both the second sub-electrodes and the third sub-electrodes can be strip electrodes, and the second electrode layer 25 can also be an entire-surface covering electrode layer or comprise strip electrodes corresponding to the second sub-electrodes and strip electrodes corresponding to the third sub-electrodes.

It should be explained that the second sub-electrodes and the third sub-electrodes are individually controlled. The light grating assembly 20 further comprises first wirings connected to the second sub-electrodes and second wirings connected to the third sub-electrodes for applying voltages to the second sub-electrodes and the third sub-electrodes respectively.

In particular, simultaneously applying voltages to the second sub-electrodes, the third sub-electrodes and the second electrode layer 25 makes the long axes of the first liquid crystal molecules 2311, the long axes of the first dye molecules 2321, the long axes of the second liquid crystal molecules 2312, and the long axes of the second dye molecules 2322 arranged along the first direction X. In the meantime, light transmission axes of the first dye molecules 2321 and the light transmission axis direction of the second dye molecules 2322 are parallel to the second direction Y, namely, are parallel to the light transmission axis direction of the first polarizer 30. In the meantime, light emitted out from the display panel 10 can pass through the light grating assembly 20, namely, the light grating assembly 20 does not change the light exiting path of the display panel 10 to make the display module in the 2D display state.

Furthermore, controlling the voltage of the second sub-electrodes, the third sub-electrodes and the second electrode layer 25 to vary, or controlling continuous application of voltages to the second sub-electrodes and the second electrode layer 25 with the third sub-electrodes not applied with a voltage, makes the long axes of the first liquid crystal molecules 2311 and the long axes of the first dye molecules 2321 keep the arrangement along the first direction X and makes the second liquid crystal molecules 2312 long axis and the long axes of the second dye molecules 2322 rotate to be arranged along the second direction Y. In the meantime, the light transmission axis direction of the first dye molecules 2321 is parallel to the second direction Y, namely, is parallel to the light transmission axis direction of the first polarizer 30. The light absorbing axis direction of the second dye molecules 2322 is parallel to the second direction Y, namely, is parallel to the light transmission axis direction of the first polarizer 30 such that light emitted out from the display panel 10 can pass through the first regions 201 and no light or a portion of light passes through the second regions 202 to make the light grating assembly 20 form light and dark stripes structure, to make the display module in the 3D display state.

It should be explained that in other embodiment of the present application, the first polarizer 30 can also be disposed on a side of the light grating assembly 20 away from the display panel 10, namely, the display module with the display panel 10, the light grating assembly 20, and the first polarizer 30 sequentially stacked from bottom to top, and a specific structure of the light grating assembly 20 can be the same as that of the above embodiment, which is not described repeatedly here.

As described above, in the present embodiment, the liquid crystal molecules and the dye molecules in the liquid crystal layer 20 can be controlled to rotate to make the first regions 201 in the light transmission state and the second regions 202 in the light transmission state or the light absorption state to achieve the display module switching between the 2D display and the 3D display. In the present embodiment, only cooperation with the upper polarizer of the display panel 10 is needed to achieve arrangement of light and dark stripes of the light grating assembly 20. Compared to a conventional technology of polarizers required to be disposed on two sides of the liquid crystal light grating structure, the present application can save use of one polarizer, which improves light weight and thinness of the display module. Furthermore, the display panel 10 in the display module provided by the embodiment of the present application can be an LCD display panel or an OLED display panel.

Figure 7:
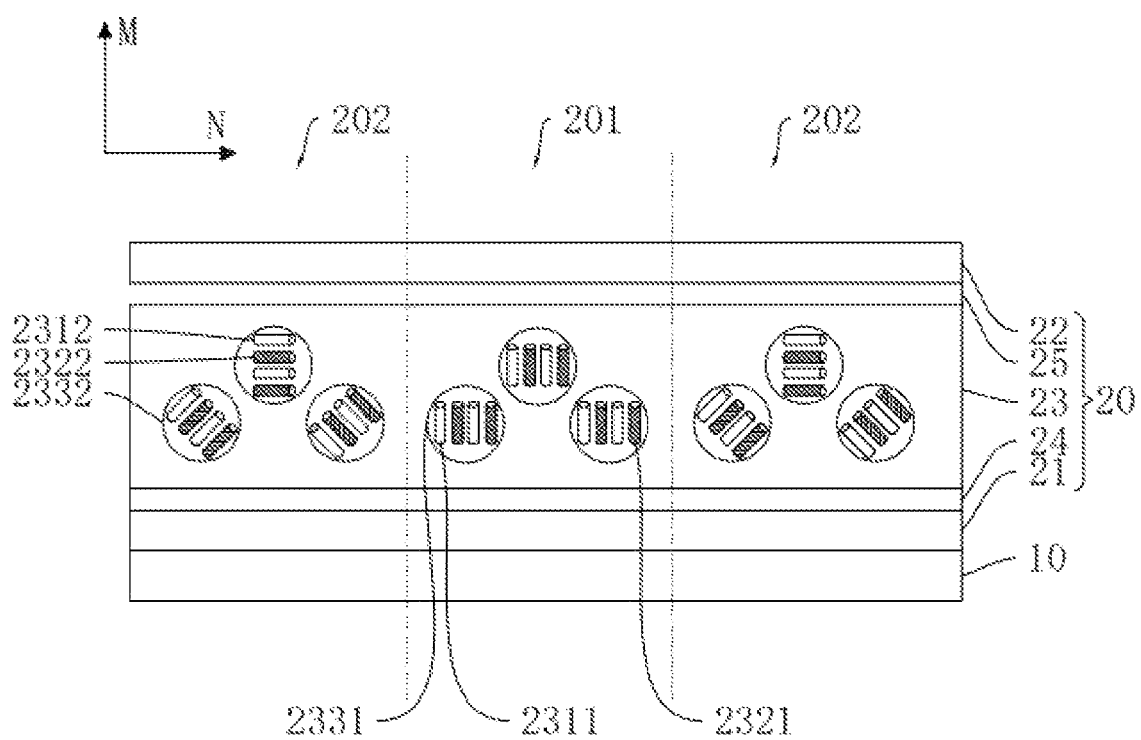
FIG. 7 is still another schematic structural view of the display module provided by the embodiment of the present application.

Furthermore, the embodiment of the present application further provides a display module, with reference to FIG. 7, the display module comprises the display panel 10 and the light grating assembly 20, and the light grating assembly 20 is disposed on a side of the display panel 10.

The light grating assembly 20 comprises a plurality of first regions 201 and a plurality of second regions 202 disposed alternately, and one of the second regions 202 is disposed between adjacent two of the first regions 201. The light grating assembly 20 comprises a first substrate 21 and a second substrate 22 disposed oppositely and a liquid crystal layer 23 disposed between the first substrate 21 and the second substrate 22.

Furthermore, the liquid crystal layer 23 comprises first polymer liquid crystals and first dye molecules 2321 distributed in the first regions 201, and second polymer liquid crystals and second dye molecules 2322 distributed in the second regions 202, and the first polymer liquid crystals comprises first liquid crystal molecules 2311 and first polymer structures 2331. The second polymer liquid crystals comprises second liquid crystal molecules 2312 and second polymer structures 2332.

In the embodiment of the present application, the display module switches between a first mode and a second mode. Under the first mode, light entering the liquid crystal layer 23 along a third direction M has a refractive index through the first liquid crystal molecules 2311 the same as a refractive index through the first polymer structures 2331. Both the long axes of the second liquid crystal molecules 2312 and the long axes of the second dye molecules 2322 are arranged along the third direction M, and the third direction M is perpendicular to the first substrate 21 and the second substrate 22 to make light pass through the first regions 201 and the second regions 202. Under the second mode, light entering the liquid crystal layer 23 along the third direction M has the refractive index through the first liquid crystal molecules 2311 the same as the refractive index through the first polymer structures 2331, and has a refractive index through at least some of the second liquid crystal molecules 2312 different from a refractive index through the second polymer structures 2332 such that an amount of the light passing through the first regions 201 is greater than an amount of the light passing through the second regions 202.

During application of the embodiment, the embodiment of the present application, by controlling a refractive index relationship between liquid crystal molecules and polymer structure under the first mode and the second mode, makes the refractive indexes of light passing through the liquid crystal molecules and the polymer structure the same such that the light passes through the liquid crystal layer 23 without being scattered to make the display module in the 2D display state. Alternatively, the refractive indexes of light passing through the liquid crystal molecules and the polymer structure are made different such that the light is scattered, and the scattered light would be absorbed by dye molecules to make light or a portion of light not pass through the liquid crystal layer 23 to further form alternately light and dark stripes in the light grating assembly, to make the display module in the 3D display state.

Figure 8:
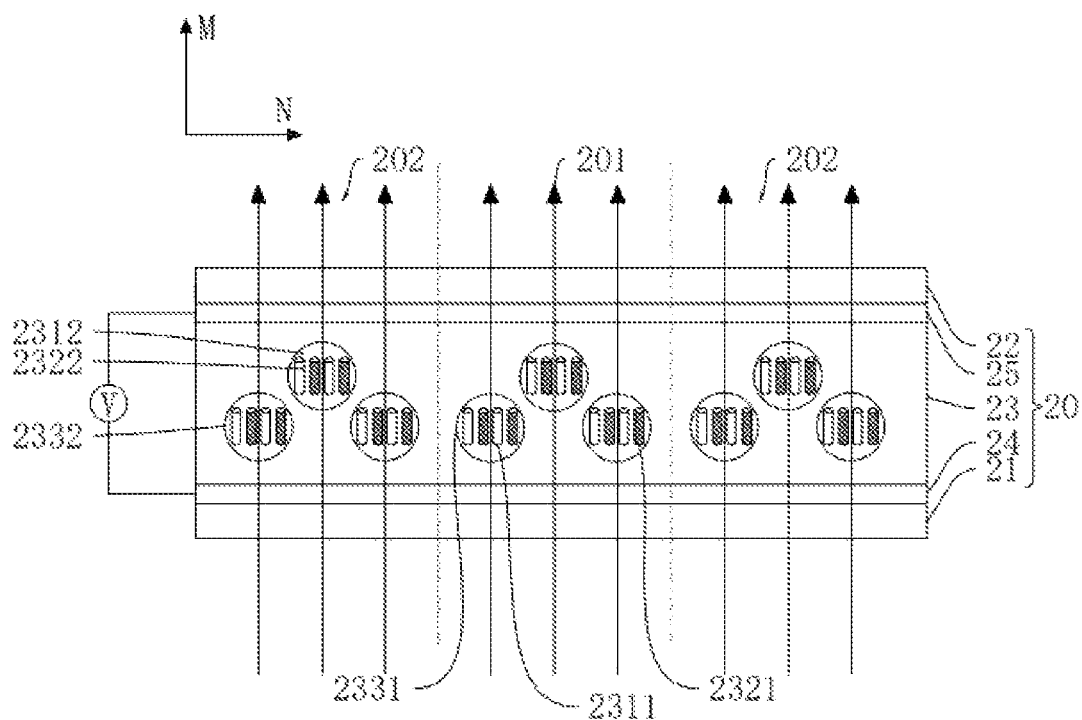
FIG. 8 is still another schematic view of a light path of the display module provided by the embodiment of the present application under the first mode.
Figure 9:
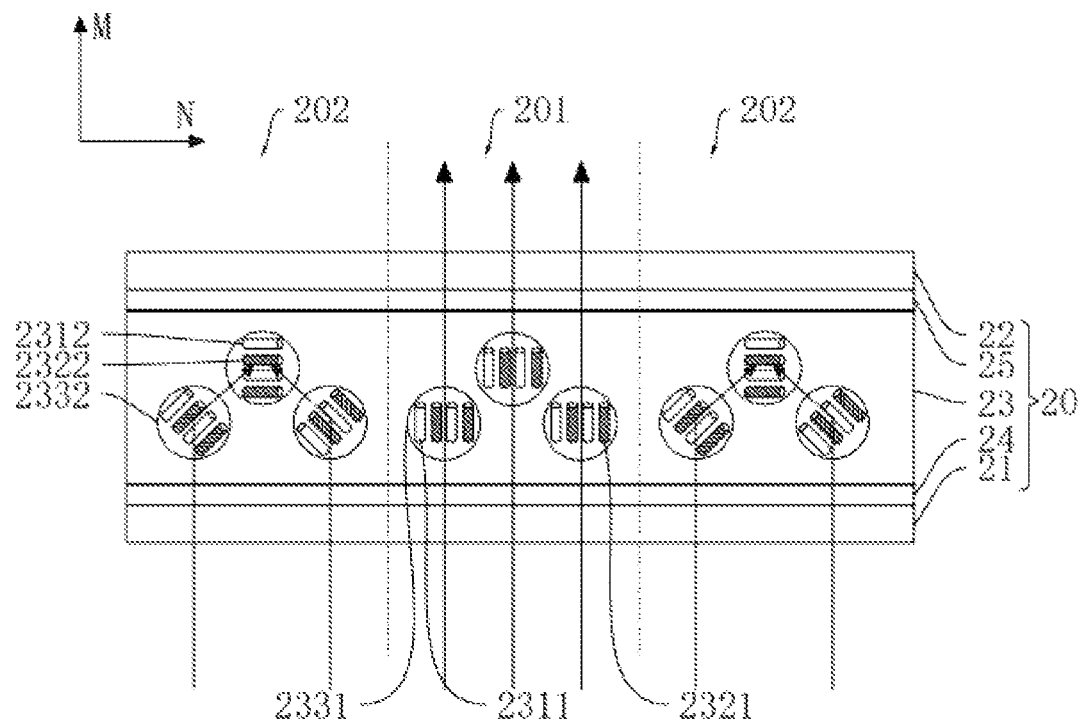
FIG. 9 is still another schematic view of a light path of the display module provided by the embodiment of the present application under the second mode.

In an embodiment of the present application, with reference to FIG. 7, FIG. 8, and FIG. 9, the display module comprises a display panel 10 and a light grating assembly 20 disposed on a light exiting side of the display panel 10. The display panel 10 can be a liquid crystal display panel and an organic light emitting diode display panel. The liquid crystal display panel can comprise upper and lower polarizers (not shown in the figures). The organic light emitting diode display panel can comprise upper polarizer (not shown in the figures), or use a color filter layer replacing the polarizer such that no upper polarizer is disposed on the organic light emitting diode display panel, which is not limited here.

The light grating assembly 20 comprises a first substrate 21 and a second substrate 22 disposed oppositely, a first electrode layer 24 disposed on a side of the first substrate 21 near the second substrate 22, a second electrode layer 25 disposed on a side of the second substrate 22 near the first substrate 21, and a liquid crystal layer 23 disposed between the first electrode layer 24 and the second electrode layer 25.

The light grating assembly 20 comprises a plurality of first regions 201 and a plurality of second regions 202 disposed alternately, and one of the second regions 202 is disposed between adjacent two of the first regions 201. The liquid crystal layer 23 comprises first polymer liquid crystals and first dye molecules 2321 distributed in the first regions 201, and second polymer liquid crystals and second dye molecules 2322 distributed in the second regions 202, and the first polymer liquid crystals comprises first liquid crystal molecules 2311 and first polymer structures 2331. The second polymer liquid crystals comprises second liquid crystal molecules 2312 and second polymer structures 2332.

The first liquid crystal molecules 2311 and the second liquid crystal molecules 2312 are positive liquid crystals, and the first polymer liquid crystals are polymer dispersed liquid crystals, the second polymer liquid crystals are polymer dispersed liquid crystals. The first polymer structures 2331 and the second polymer structures 2332 are continuous phases and are isotropic, and have the same refractive index along any directions for light passing through the first polymer structures 2331 and the second polymer structures 2332 such that controlling arrangement direction of the liquid crystal molecules changes the refractive index of the liquid crystal molecules to light to generate a scattering phenomenon between the liquid crystal molecules and polymer structure.

In particular, a third direction M is set to be perpendicular to the first substrate 21 and the second substrate 22 and a fourth direction N is set to be parallel to the first substrate 21 and the second substrate 22. When the first electrode layer 24 and the second electrode layer 25 are not applied with voltages, the long axes of the first liquid crystal molecules 2311 and the long axes of the first dye molecules 2321 are arranged along the third direction M. The long axes of the second liquid crystal molecules 2312 and the second dye molecules 2322 in the second regions 202 are randomly and disorderly arranged. A refractive index of the first liquid crystal molecules 2311 arranged along the third direction M for incident light along the third direction M is the same as a refractive index of the first polymer structures 2331, and a refractive index of the second liquid crystal molecules 2312 along the third direction M for incident light along the third direction M is the same as a refractive index of the second polymer structures 2332.

It should be explained that the second polymer structures 2332 is randomly and disorderly arranged, then the second polymer structures 2332 is probably arranged along any directions. Furthermore, in the figures provided by the embodiment of the present application, circles refer to the first polymer structures 2331 and the second polymer structures 2332.

In the present embodiment, the first dye molecules 2321 and the light absorbing axis direction of the second dye molecules 2322 can be parallel to their long axis directions, and the first dye molecules 2321 and the light transmission axis direction of the second dye molecules 2322 can be perpendicular to their long axis directions.

Further, when the display module is in the first mode, the first electrode layer 24 and the second electrode layer 25 are applied with voltages such that the long axes of the first liquid crystal molecules 2311, the long axes of the first dye molecules 2321, the long axes of the second liquid crystal molecules 2312, and the long axes of the second dye molecules 2322 are arranged along the third direction M to make light emitted out from the display panel 10 able to pass through the first regions 201 and the second regions 202 such that the display module is in the 2D display state.

When the display module is in the second mode, applying voltages to the first electrode layer 24 and the second electrode layer 25 is not needed. Then, for the first regions 201, because the first liquid crystal molecules 2311 and the first dye molecules 2321 are also arranged along the third direction M, incident light along the third direction M has the refractive index through the first liquid crystal molecules 2311 the same as the refractive index through the first polymer structures 2331, no scattering occurs. For the second regions 202, because the second liquid crystal molecules 2312 and the second dye molecules 2322 are randomly and disorderly arranged, namely an arrangement direction of the long axes of at least some of the second liquid crystal molecules 2312 and an arrangement direction of the second polymer structures 2332 are arranged along a direction other than the third direction M, then incident light along the third direction M has the refractive index through at least some of the second liquid crystal molecules 2312 different from the refractive index through the second polymer structures 2332 such that light passing through the second regions 202 has a scattering phenomenon to be absorbed by the second dye molecules 2322 to further make a portion or all of light emitted out through the display panel 10 unable to pass through the second regions 202 to form alternately light and dark stripes in the light grating assembly 20 to make the display module in the 3D display state.

Optionally, the first dye molecules 2321 and the second dye molecules 2322 can be black dichroic dyes, then the first dye molecules 2321 and the second dye molecules 2322 present black when absorbing light to facilitate the light grating assembly 20 presenting light and dark stripes under the second mode.

Figure 10:
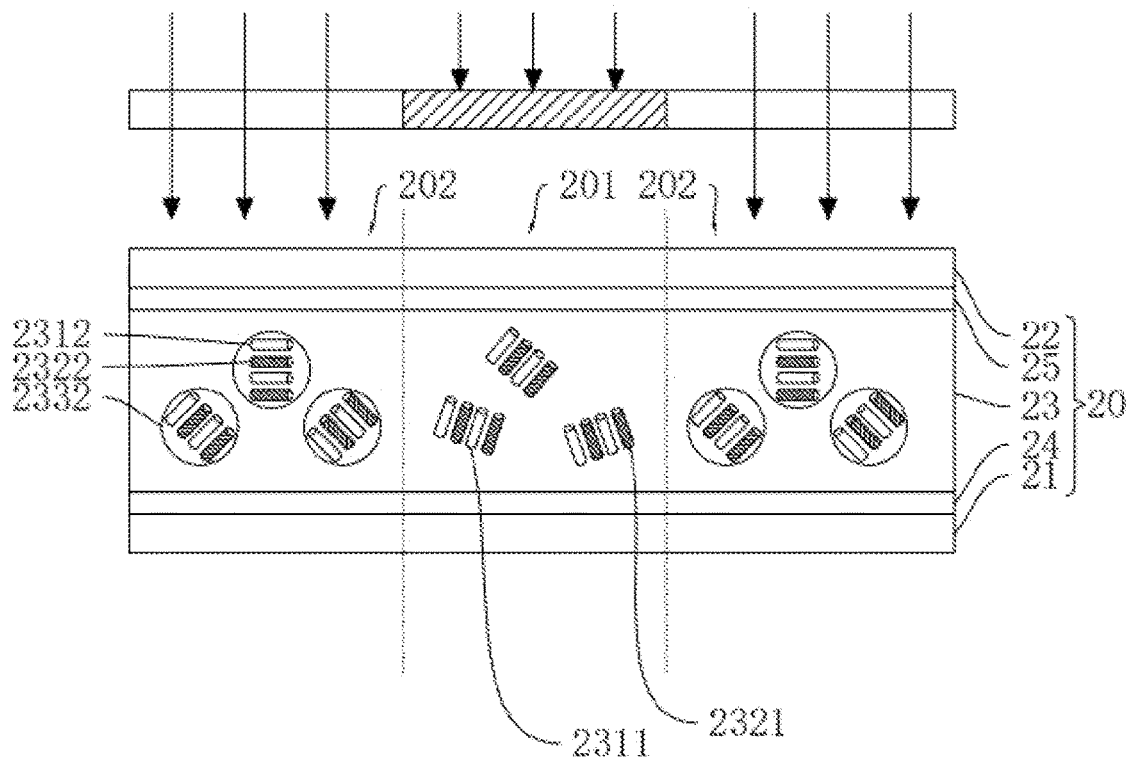
FIGS. 10 to 12 are schematic views of manufacturing processes of the display module provided by the embodiment of the present application.
Figure 11:
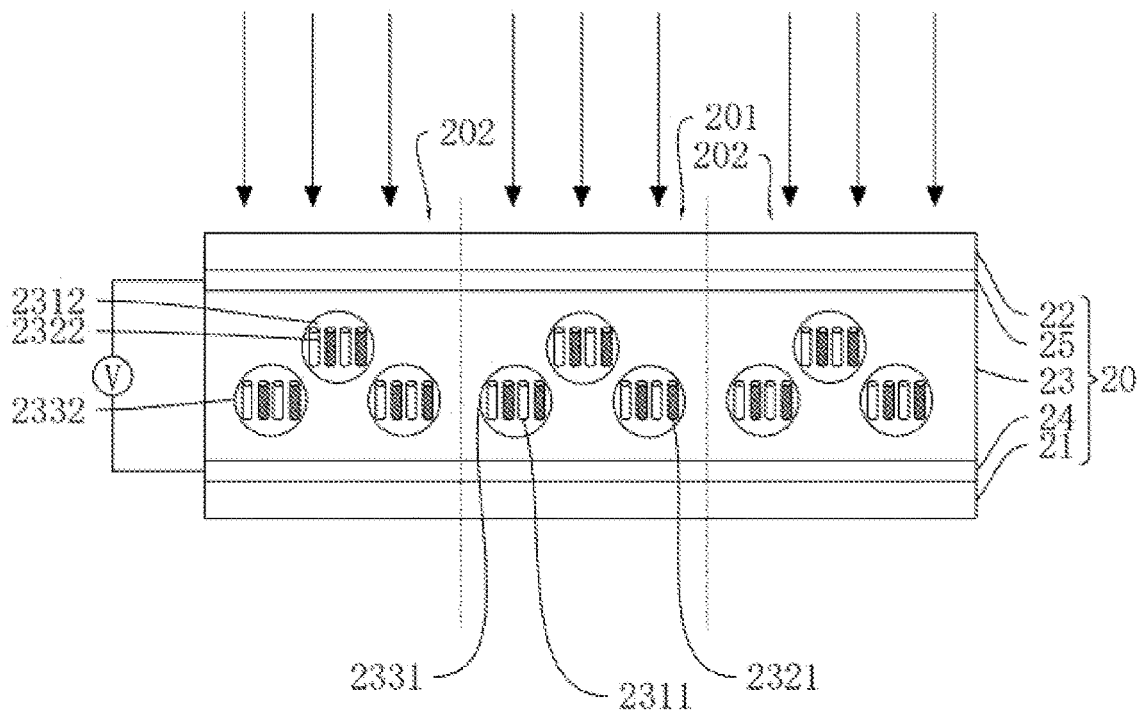
Figure 12:
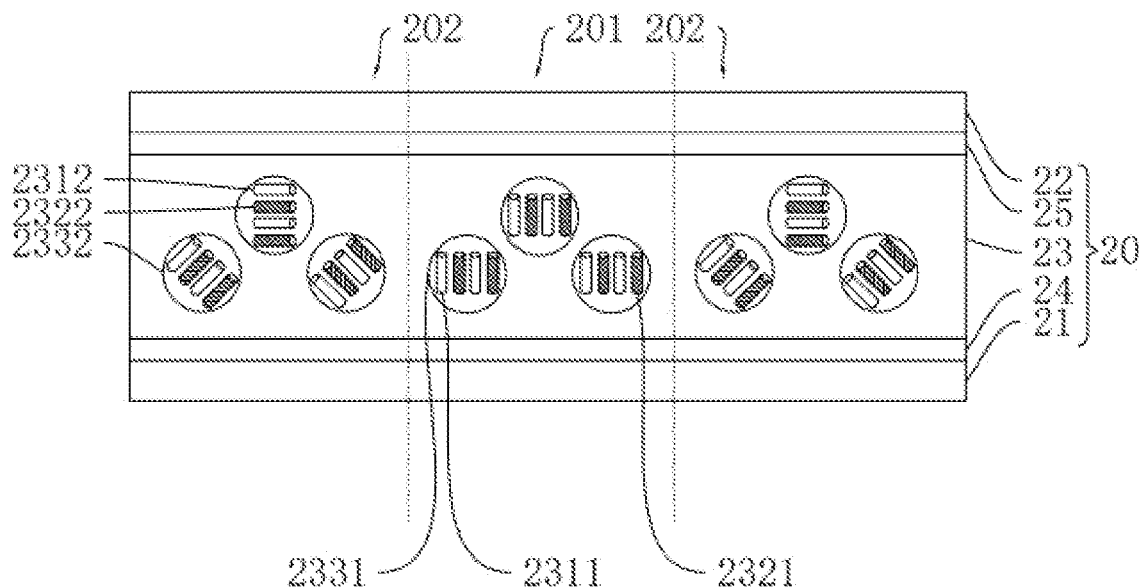

Furthermore, the present embodiment also provides a manufacturing method for the above light grating assembly 20, with reference to FIGS. 10 to 12, the method specifically can comprise: injecting the liquid crystal layer 23 between the first substrate 21 and the second substrate 22, wherein the liquid crystal layer 23 comprises liquid crystal molecules, dye molecules and polymer monomers. In the meantime, because of no force of an electrical field, the liquid crystal molecules, the dye molecules, and the polymer monomers are randomly and disorderly arranged.

Then, a mask plate is formed on a side of the second substrate 22 away from the first substrate 21, and stripe aperture is formed on a position of the mask plate corresponding to the second regions 202.

Ultraviolet (UV) is employed to irradiate a side of the second substrate 22 away from the first substrate 21 to cure the polymer monomers in the second regions 202 to form the second polymer structures 2332, In the meantime, the long axes of the second liquid crystal molecules 2312 and the long axes of the second dye molecules 2322 are randomly and disorderly arranged.

Then, the mask plate is removed, and the first electrode layer 24 and the second electrode layer 25 are applied with voltages such that long axes of all of the liquid crystal molecules are arranged along the third direction M. Simultaneously, UV is used again to irradiate the side of the second substrate 22 away from the first substrate 21 to cure the polymer monomers in the first regions 201 to form the first polymer structures 2331. The first polymer structures 2331 can make the first liquid crystal molecules 2311 arranged along the third direction M.

Finally, voltages application to the first electrode layer 24 and the second electrode layer 25 are stopped, then the long axes of the first liquid crystal molecules 2311 and the long axes of the first dye molecules 2321 in the first regions 201 are arranged along the third direction M, and the long axes of the second liquid crystal molecules 2312 and the long axes of the second dye molecules 2322 in the second regions 202 are randomly and disorderly arranged.

As such, the present embodiment controls arrangement directions of the liquid crystal molecules and the polymer structure under the first mode and the second mode and makes the arrangement direction of long axes of the liquid crystal molecules the same as the arrangement direction of the polymer structure such that light can pass the liquid crystal layer 23 without being scattered to make the display module in a 2D display state. Alternatively, the arrangement direction of the long axes of the liquid crystal molecules is made different from the arrangement direction of the polymer structure such that light is scattered, and the scattered light would be absorbed by dye molecules such that light or a portion of light does to pass through the liquid crystal layer 23 to further form alternately light and dark stripes in the light grating assembly to make the display module in a 3D display state. Moreover, the display module provided by the present embodiment is used without a polarizer and can be suitable for a Pol-less type (depolarization technology) display panel, which can effectively reduce a thickness of the display module. Furthermore, the light grating assembly 20 provided by the present embodiment only needs to be applied with a voltage under the first mode, and is without an applied voltage under the second mode, which can further reduce a power consumption of the display module.

Figure 13:
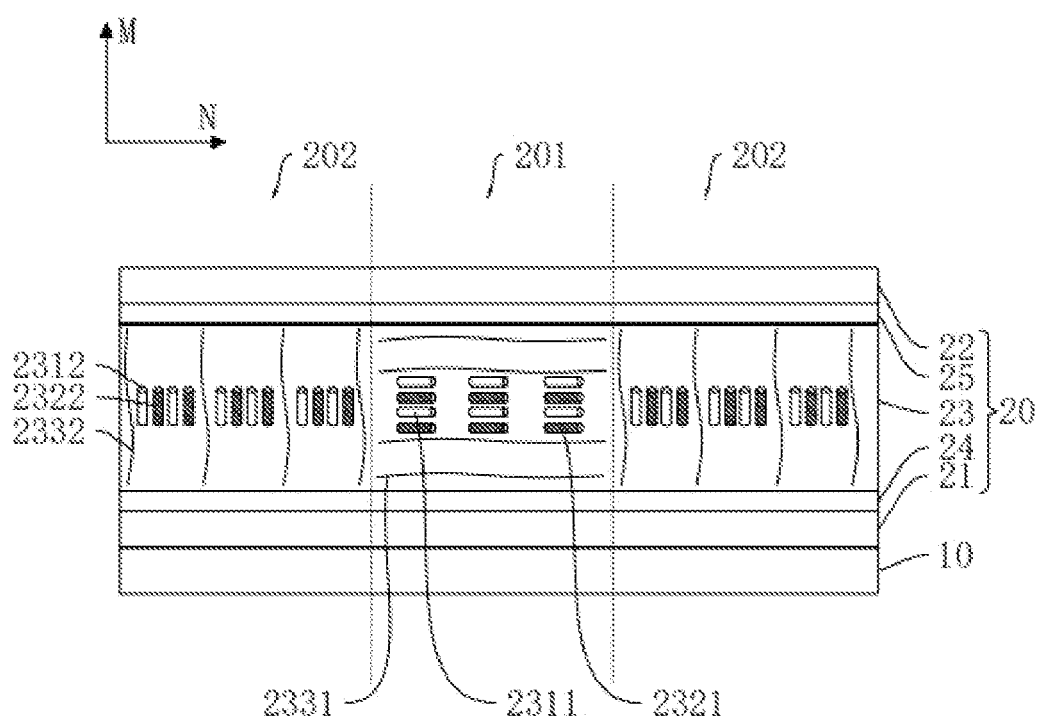
FIG. 13 is another schematic structural view of the display module provided by the embodiment of the present application.
Figure 14:
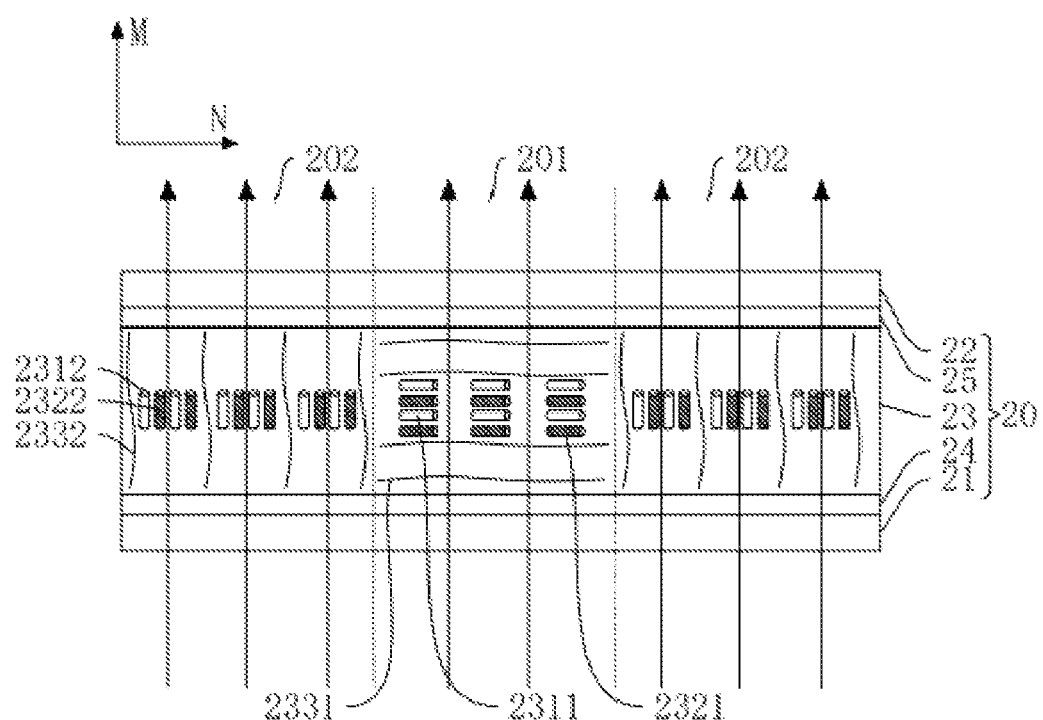
FIG. 14 is another schematic view of a light path of the display module provided by the embodiment of the present application under the first mode.
Figure 15:
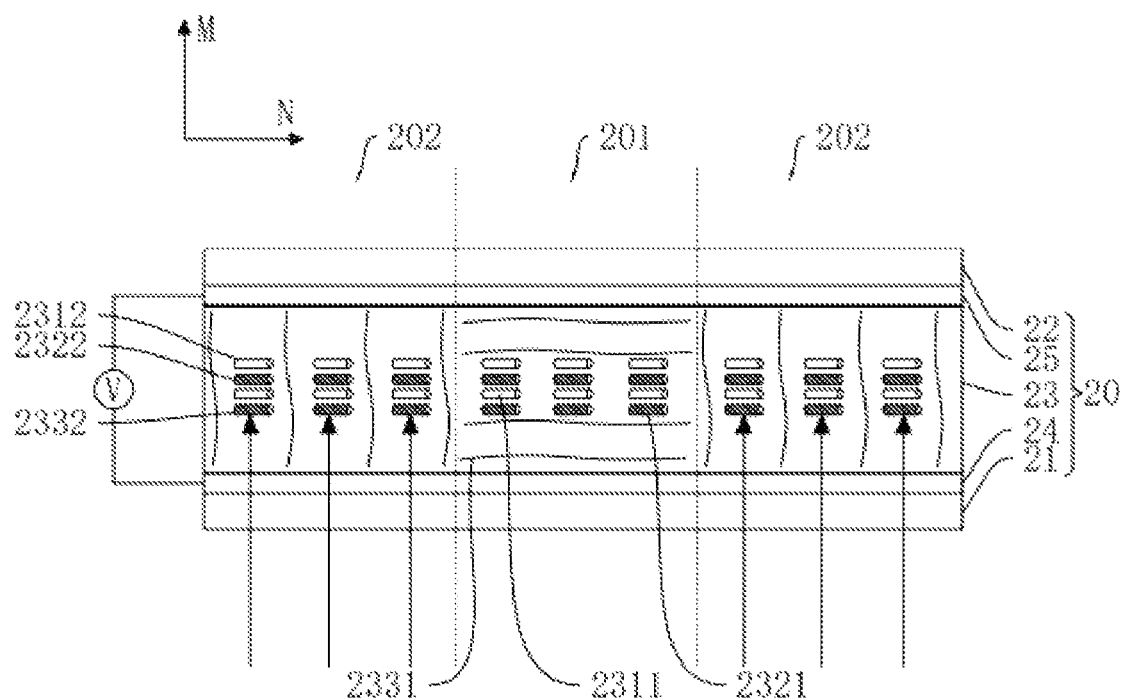
FIG. 15 is another schematic view of a light path of the display module provided by the embodiment of the present application under the second mode.

In another embodiment of the present application, with reference to FIG. 13, FIG. 14 and FIG. 15, a difference thereof from the former embodiment is that the first liquid crystal molecules 2311 and the second liquid crystal molecules 2312 are negative liquid crystals, and the first polymer liquid crystals and the second polymer liquid crystals are polymer network liquid crystals. The first polymer structures 2331 are arranged along the fourth direction N, and the second polymer structures 2332 are arranged along the third direction M.

Then, when the first electrode layer 24 and the second electrode layer 25 are not applied with a voltage, the long axes of the first liquid crystal molecules 2311, the long axes of the first dye molecules 2321 are arranged along the fourth direction N, and the long axes of the second liquid crystal molecules 2312 and the long axes of the second dye molecules 2322 are arranged along the third direction M.

It should be explained that in the present embodiment, the first dye molecules 2321 and the light transmission axis direction of the second dye molecules 2322 are parallel to a long axis direction thereof, and the first dye molecules 2321 and the light absorbing axis direction of the second dye molecules 2322 are perpendicular to the long axis direction thereof.

Further, when the display module is in the first mode, applying a voltage to the first electrode layer 24 and the second electrode layer 25 is not needed. In the meantime, for the first regions 201, the long axes of the first liquid crystal molecules 2311, the long axes of the first dye molecules 2321, and the first polymer structures 2331 are arranged along the fourth direction N, and light passing through the first regions 201 is not scattered, an simultaneously would not be absorbed by the first dye molecules 2321. As such, light emitted out through the display panel 10 passes the first regions 201. For the second regions 202, the second liquid crystal molecules 2312, the second dye molecules 2322, and the second polymer structures 2332 are arranged along the third direction N, and light passing through the second regions 202 is not scattered. In another aspect, because the first dye molecules 2321 and the second dye molecules 2322 are arranged perpendicular to the first substrate 21 and the second substrate 22, then relative to a light incident direction of the light grating assembly 20, the dye molecules are equal to points distributed in the liquid crystal layer 23 and barely perform a blocking function to incident light such that light emitted out through the display panel 10 can pass the second regions 202. In the meantime, the light grating assembly 20 has no modulation function to light to make the display module in the 2D display state.

When the display module is in the second mode, a voltage is applied to the first electrode layer 24 and the second electrode layer 25 such that the long axes of the first liquid crystal molecules 2311, the long axes of the first dye molecules 2321, the long axes of the second liquid crystal molecules 2312, and the long axes of the second dye molecules 2322 are arranged along the fourth direction N. In the meantime, the arrangement directions of the first liquid crystal molecules 2311 and the first dye molecules 2321 in the first regions 201 keep unchanged, then light can pass through the first regions 201. For different arrangement directions of the second regions 202, the second liquid crystal molecules 2312 and the second polymer structures 2332, light passing through the second regions 202 would be scattered, and the scattered light would be absorbed by the second dye molecules 2322 such that a portion or all of light cannot pass through the second regions 202. Then, alternately light and dark stripes are further formed in the light grating assembly 20 such that the display module is in the 2D display state.

As such, the present embodiment controls arrangement directions of the liquid crystal molecules and the polymer structure under the first mode and the second mode and makes the arrangement direction of long axes of the liquid crystal molecules the same as the arrangement direction of the polymer structure such that light can pass the liquid crystal layer 23 without being scattered to make the display module in a 2D display state. Alternatively, the arrangement direction of the long axes of the liquid crystal molecules is made different from the arrangement direction of the polymer structure such that light is scattered, and the scattered light would be absorbed by dye molecules such that light or a portion of light does to pass through the liquid crystal layer 23 to further form alternately light and dark stripes in the light grating assembly to make the display module in a 3D display state. Moreover, the display module provided by the present embodiment is used without a polarizer and can be suitable for a pol-less type (depolarization technology) display panel, which can effectively reduce a thickness of the display module. Furthermore, the light grating assembly 20 provided by the present embodiment only needs to be applied with a voltage under the second mode, and is without an applied voltage under the first mode, which can further reduce a power consumption of the display module.

Furthermore, the embodiment of the present application also provides a display device, and the display device comprises the display module of any one of the above embodiments.

In the above-mentioned embodiments, the descriptions of the various embodiments are focused. For the details of the embodiments not described, reference may be made to the related descriptions of the other embodiments.

The display module and the display device provided by the embodiment of the present application are described in detail as above. The principles and implementations of the present application are described in the following by using specific examples. The description of the above embodiments is only for assisting understanding of the technical solutions of the present application and the core ideas thereof. Those of ordinary skill in the art should understand that they can still modify the technical solutions described in the foregoing embodiments are or equivalently replace some of the technical features. These modifications or replacements do not depart from the essence of the technical solutions of the embodiments of the present application.

What is claimed is:

1. A display module, comprising a display panel, a light grating assembly disposed on a side of the display panel, and a first polarizer disposed between the display panel and the light grating assembly;
    wherein the light grating assembly comprises a plurality of first regions and a plurality of second regions alternately disposed, one of the second regions is disposed between adjacent two of the first regions;
    wherein the light grating assembly further comprises:
        a first substrate;
        a second substrate disposed opposite to the first substrate; and
        a liquid crystal layer disposed between the first substrate and the second substrate, and comprising first liquid crystal molecules and first dye molecules distributed in the first regions and second liquid crystal molecules and second dye molecules distributed in the second regions;
    wherein the display module switches between a first mode and a second mode, under the first mode, a light transmission axis direction of the first dye molecules, a light transmission axis direction of the second dye molecules are parallel to a light transmission axis direction of the first polarizer to make light pass through the first regions and the second regions; under the second mode, a light transmission axis direction of the first dye molecules is parallel to the light transmission axis direction of the first polarizer, a light absorbing axis direction of the second dye molecules is parallel to the light transmission axis direction of the first polarizer to make an amount of light passing through the first regions greater than an amount of light passing through the second regions.

2. The display module according to claim 1, wherein under the first mode, long axes of the first liquid crystal molecules, long axes of the first dye molecules, long axes of the second liquid crystal molecules, and long axes of the second dye molecules are arranged along a first direction, under the second mode, the long axes of the first liquid crystal molecules and the long axes of the first dye molecules are arranged along the first direction, and the long axes of the second liquid crystal molecules and the long axes of the second dye molecules are arranged along a second direction, and the first direction is perpendicular to the second direction;
    wherein a light absorbing axis direction of the first dye molecules is parallel to a long axis direction of the first dye molecules, the light absorbing axis direction of the second dye molecules is parallel to a long axis direction of the second dye molecules, the light transmission axis direction of the first polarizer is parallel to the second direction.

3. The display module according to claim 2, wherein the light grating assembly further comprises a first electrode layer disposed on a side of the first substrate near the second substrate and a second electrode layer disposed on a side of the second substrate near the first substrate, the first electrode layer and the second electrode layer are configured to apply a voltage and at least adjust an arrangement direction of the long axes of the second liquid crystal molecules arrangement direction to control the display module to switch between the first mode and the second mode.

4. The display module according to claim 3, wherein the first liquid crystal molecules and the second liquid crystal molecules are negative liquid crystals, and the first electrode layer comprises first sub-electrodes disposed in the second regions.

5. The display module according to claim 4, wherein the light grating assembly further comprises a first alignment layer disposed on a side of the first electrode layer away from the first substrate and a second alignment layer disposed on a side of the second electrode layer away from the second substrate such that an the initial alignment direction of the first liquid crystal molecules and an the initial alignment direction of the second liquid crystal molecules are parallel to the first direction.

6. The display module according to claim 3, wherein the first liquid crystal molecules and the second liquid crystal molecules are positive liquid crystals, the first electrode layer comprises second sub-electrodes disposed in the first regions and third sub-electrodes disposed in the second regions, the light grating assembly further comprises first wirings connected to the second sub-electrodes and second wirings connected to the third sub-electrodes to apply voltages to the second sub-electrodes and the third sub-electrodes respectively.

7. The display module according to claim 6, wherein the light grating assembly further comprises a third alignment layer disposed on a side of the first electrode layer away from the first substrate and a fourth alignment layer disposed on a side of the second electrode layer away from the second substrate such that an the initial alignment direction of the first liquid crystal molecules and an the initial alignment direction of the second liquid crystal molecules are perpendicular to the first direction.

8. The display module according to claim 2, wherein the first direction is perpendicular to the first substrate and the second substrate.

9. A display module, comprising a display panel and a light grating assembly disposed on a side of the display panel;
  wherein the light grating assembly comprises a plurality of first regions and a plurality of second regions alternately disposed, one of the second regions is disposed between adjacent two of the first regions;
  wherein the light grating assembly further comprises:
    a first substrate;
    a second substrate disposed opposite to the first substrate; and
    a liquid crystal layer disposed between the first substrate and the second substrate and comprising first polymer liquid crystals and first dye molecules distributed in the first regions and second polymer liquid crystals and second dye molecules distributed in the second regions, and the first polymer liquid crystals comprises first liquid crystal molecules and first polymer structures, the second polymer liquid crystals comprises second liquid crystal molecules and second polymer structures;
  wherein the display module switches between a first mode and a second mode, under the first mode, light entering the liquid crystal layer along a third direction has a refractive index through the first liquid crystal molecules the same as a refractive index through the first polymer structures, long axes of the second liquid crystal molecules and long axes of the second dye molecules are arranged along the third direction, and the third direction is perpendicular to the first substrate and the second substrate such that the light passes through the first regions and the second regions, under the second mode, light entering the liquid crystal layer along the third direction has the refractive index through the first liquid crystal molecules the same as the refractive index through the first polymer structures, and has a refractive index through at least some of the second liquid crystal molecules different from a refractive index through the second polymer structures such that an amount of the light passing through the first regions is greater than an amount of the light passing through the second regions.

10. The display module according to claim 9, wherein the first liquid crystal molecules and the second liquid crystal molecules are positive liquid crystals, the first polymer liquid crystals and the second polymer liquid crystals are polymer dispersed liquid crystals, under the first mode, long axes of the first liquid crystal molecules and long axes of the first dye molecules are arranged along the third direction such that the light entering the liquid crystal layer along the third direction has the refractive index through the first liquid crystal molecules the same as the refractive index through the first polymer structures.

11. The display module according to claim 10, wherein under the second mode, long axes of at least some of the second liquid crystal molecules are arranged along a direction other than the third direction such that the light entering the liquid crystal layer along the third direction has the refractive index through at least some of the second liquid crystal molecules different from the refractive index through the second polymer structures.

12. The display module according to claim 9, wherein the first liquid crystal molecules and the second liquid crystal molecules are negative liquid crystals, and the first polymer liquid crystals and the second polymer liquid crystals are polymer network liquid crystals, under the first mode, long axes of the first liquid crystal molecules, long axes of the first dye molecules, and the first polymer structures are arranged along a fourth direction, the long axes of the second liquid crystal molecules, the long axes of the second dye molecules, and the second polymer structures are arranged along the third direction, and the fourth direction is perpendicular to the third direction.

13. The display module according to claim 12, wherein under the second mode, long axes of the first liquid crystal molecules, long axes of the first dye molecules, long axes of the second liquid crystal molecules, long axes of the second dye molecules, and the first polymer structures are arranged along the fourth direction and the second polymer structures is arranged along the third direction.

14. The display module according to claim 9, wherein the light grating assembly further comprises a first electrode layer disposed on a side of the first substrate near the second substrate and a second electrode layer disposed on a side of the second substrate near the first substrate, the first electrode layer and the second electrode layer are configured to apply a voltage and at least adjust an arrangement direction of the long axes of the second liquid crystal molecules arrangement direction to control the display module to switch between the first mode and the second mode.

15. A display device, comprising a display module, the display module comprising a display panel and a light grating assembly disposed on a side of the display panel;
  wherein the light grating assembly comprises a plurality of first regions and a plurality of second regions alternately disposed, one of the second regions is disposed between adjacent two of the first regions;
  wherein the light grating assembly further comprises:
    a first substrate;
    a second substrate disposed opposite to the first substrate; and
    a liquid crystal layer disposed between the first substrate and the second substrate and comprising first polymer liquid crystals and first dye molecules distributed in the first regions and second polymer liquid crystals and second dye molecules distributed in the second regions, and the first polymer liquid crystals comprises first liquid crystal molecules and first polymer structures, the second polymer liquid crystals comprises second liquid crystal molecules and second polymer structures;
  wherein the display module switches between a first mode and a second mode, under the first mode, light entering the liquid crystal layer along a third direction has a refractive index through the first liquid crystal molecules the same as a refractive index through the first polymer structures, long axes of the second liquid crystal molecules and long axes of the second dye molecules are arranged along the third direction, and the third direction is perpendicular to the first substrate and the second substrate such that the light passes through the first regions and the second regions, under the second mode, light entering the liquid crystal layer along the third direction has the refractive index through the first liquid crystal molecules the same as the refractive index through the first polymer structures, and has a refractive index through at least some of the second liquid crystal molecules different from a refractive index through the second polymer structures such that an amount of the light passing through the first regions is greater than an amount of the light passing through the second regions.

16. The display device according to claim 15, wherein the first liquid crystal molecules and the second liquid crystal molecules are positive liquid crystals, the first polymer liquid crystals and the second polymer liquid crystals are polymer dispersed liquid crystals, under the first mode, long axes of the first liquid crystal molecules and long axes of the first dye molecules are arranged along the third direction such that the light entering the liquid crystal layer along the third direction has the refractive index through the first liquid crystal molecules the same as the refractive index through the first polymer structures.

17. The display device according to claim 16, wherein under the second mode, long axes of at least some of the second liquid crystal molecules are arranged along a direction other than the third direction such that the light entering the liquid crystal layer along the third direction has the refractive index through at least some of the second liquid crystal molecules different from the refractive index through the second polymer structures.

18. The display device according to claim 15, wherein the first liquid crystal molecules and the second liquid crystal molecules are negative liquid crystals, and the first polymer liquid crystals and the second polymer liquid crystals are polymer network liquid crystals, under the first mode, long axes of the first liquid crystal molecules, long axes of the first dye molecules, and the first polymer structures are arranged along a fourth direction, the long axes of the second liquid crystal molecules, the long axes of the second dye molecules, and the second polymer structures are arranged along the third direction, and the fourth direction is perpendicular to the third direction.

19. The display device according to claim 18, wherein under the second mode, long axes of the first liquid crystal molecules, long axes of the first dye molecules, long axes of the second liquid crystal molecules, long axes of the second dye molecules, and the first polymer structures are arranged along the fourth direction and the second polymer structures is arranged along the third direction.

20. The display device according to claim 15, wherein the light grating assembly further comprises a first electrode layer disposed on a side of the first substrate near the second substrate and a second electrode layer disposed on a side of the second substrate near the first substrate, the first electrode layer and the second electrode layer are configured to apply a voltage and at least adjust an arrangement direction of the long axes of the second liquid crystal molecules arrangement direction to control the display module to switch between the first mode and the second mode.

* * * * *